US008606219B1

(12) United States Patent
Barbee et al.

(10) Patent No.: US 8,606,219 B1
(45) Date of Patent: Dec. 10, 2013

(54) SELECTIVE SUPPRESSION OF ACCESS PROBE TRANSMISSION IN RESPONSE TO EXTERNAL IMPACT EVENT

(75) Inventors: Bryan T. Barbee, Olathe, KS (US); Clark D. Halferty, Lees Summit, MO (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/468,659

(22) Filed: May 10, 2012

(51) Int. Cl.
H04M 11/04 (2006.01)

(52) U.S. Cl.
USPC ........ 455/404.1; 455/512; 455/434; 455/410; 455/458

(58) Field of Classification Search
USPC .................................. 455/404.1, 458, 414.1
See application file for complete search history.

(56) References Cited

U.S. PATENT DOCUMENTS

| | | | |
|---|---|---|---|
| 6,067,457 A * | 5/2000 | Erickson et al. ............... 455/512 |
| 6,104,927 A | 8/2000 | Willey |
| 6,374,099 B1 * | 4/2002 | Bi et al. ...................... 455/404.1 |
| 6,535,736 B1 * | 3/2003 | Balogh et al. ................. 455/434 |
| 6,563,809 B1 | 5/2003 | Proctor, Jr. et al. |
| 7,174,152 B1 | 2/2007 | Oleniczak et al. |
| 7,206,593 B1 | 4/2007 | Yarkosky et al. |
| 7,519,077 B2 | 4/2009 | Beathard |
| 7,636,322 B1 | 12/2009 | Gandhi et al. |
| 7,848,282 B2 | 12/2010 | Padovani et al. |
| 8,040,803 B1 | 10/2011 | Pawar et al. |
| 8,107,438 B1 | 1/2012 | Singh et al. |
| 8,204,000 B1 | 6/2012 | Srinivas et al. |
| 8,238,944 B2 * | 8/2012 | Neumann ..................... 455/458 |
| 8,249,498 B1 | 8/2012 | Pulugurta |
| 8,249,546 B1 * | 8/2012 | Shah et al. .................. 455/404.1 |
| 8,254,874 B1 * | 8/2012 | Oroskar et al. ............. 455/404.1 |
| 2004/0005872 A1 * | 1/2004 | Cervinka et al. ............... 455/410 |
| 2004/0198311 A1 * | 10/2004 | Aerrabotu et al. ......... 455/404.1 |
| 2007/0242702 A1 | 10/2007 | Shim |
| 2008/0026715 A1 | 1/2008 | Gao |
| 2008/0049706 A1 | 2/2008 | Khandekar et al. |
| 2008/0066161 A1 | 3/2008 | Ohhira |
| 2009/0086629 A1 | 4/2009 | Zhang et al. |
| 2009/0170547 A1 | 7/2009 | Raghothaman et al. |
| 2009/0257361 A1 | 10/2009 | Deshpande et al. |
| 2009/0280836 A1 | 11/2009 | Chou |
| 2009/0285159 A1 | 11/2009 | Rezaiifar et al. |
| 2010/0130159 A1 * | 5/2010 | Wu et al. ..................... 455/404.1 |
| 2011/0201335 A1 | 8/2011 | Garrett et al. |
| 2011/0305197 A1 | 12/2011 | Park et al. |
| 2012/0003959 A1 | 1/2012 | Gonzalez-Canedo et al. |

FOREIGN PATENT DOCUMENTS

| | | |
|---|---|---|
| WO | WO 00/65863 | 11/2000 |
| WO | WO 01/47288 | 6/2001 |

OTHER PUBLICATIONS

3rd Generation Partnership Project 2 "3GPPS", "Upper Layer (Layer 3) Signaling Standard for cdma2000 Spread Spectrum System," 3GPP2 C.S0005-E, Version 3.0, Jun. 2011.

* cited by examiner

Primary Examiner — Charles Shedrick

(57) ABSTRACT

A method and system for managing access probe transmission in a wireless communication system. Upon determining that an external impact event, such as a severe weather event, natural disaster, criminal activity, has occurred, base stations may wirelessly broadcast a control signal that causes certain wireless communication devices served by the base stations to suppress transmission of access probes, while allowing other wireless communication devices served by the base stations to still transmit access probes. In a given coverage area, suppression of access probe transmission by one or more wireless communication devices may thereby free up access channel capacity to facilitate calls or other communications by other wireless communication devices, such as first-responder devices for instance.

19 Claims, 7 Drawing Sheets

| TIME SLOT TS1 | TIME SLOT TS2 | TIME SLOT TS3 | TIME SLOT TS4 | TIME SLOT TS5 | TIME SLOT TS6 | TIME SLOT TS7 |
|---|---|---|---|---|---|---|
| AP 1<br>AP 2 | AP 3 | AP 4<br>AP 5<br>AP 6 | AP 7 | AP 8<br>AP 9 | | AP 10 |

Fig. 3

SELECTIVE SUPPRESSION OF ACCESS PROBE TRANSMISSION IN RESPONSE TO EXTERNAL IMPACT EVENT

BACKGROUND

Unless otherwise indicated herein, the materials described in this section are not prior art to the claims and are not admitted to be prior art by inclusion in this section.

In a typical wireless communication system, a radio access network (RAN) includes one or more base stations that radiate to define one or more wireless coverage areas such as cells and cell sectors in which suitably equipped wireless communication devices (WCDs) can operate. In practice, the RAN and its served WCDs may be arranged to communicate with each other according to an agreed air interface protocol that defines a mechanism for use of communication resources to support wireless exchange of voice, data, multimedia, and/or other content. Examples of such protocols include CDMA (e.g., 1xRTT or 1xEV-DO), WiMAX, LTE, IDEN, GSM, WIFI, HSDPA, among others now known or later developed.

The air interface in each coverage area between the RAN and its served WCDs may define a forward-link (or "downlink") for carrying communications from the RAN to the WCDs and a reverse-link (or "uplink") for carrying communications from the WCDs to the RAN. In various implementations, these links may be defined on or more carrier frequencies or blocks of frequencies. Furthermore, on each link, various channels may be defined through techniques such as time division multiplexing, code division multiplexing, frequency division multiplexing, and the like.

By way of example, the forward-link may define a pilot channel for carrying a pilot signal usable by WCDs to detect and evaluate coverage, a paging channel for carrying page messages to particular WCDs, other overhead channels for carrying system parameter information and the like, and a number of traffic channels for carrying carry bearer traffic (e.g., call traffic) to WCDs. The reverse-link, on the other hand, may define an access channel for carrying messages from WCDs to facilitate registration, responding to pages, originating calls and the like, and a number of traffic channels for carrying bearer traffic from WCDs to the RAN. Depending on the protocol, the channel definitions may differ and other names for the channels may be used.

In practice, the reverse link access channel may define a number of containers, such as timeslots or resource elements, for carrying access channel messages from WCDs to the RAN. WCDs may then be arranged to transmit access channel messages called "access probes" in these containers. For instance, when a WCD first enters into wireless coverage and at other times, the WCD may transmit a radio access registration message in an access probe to the RAN, to notify the RAN where the WCD is located. Further, when the WCD seeks to originate a call (e.g., a voice call and/or data session), the WCD may transmit an origination message in an access probe to the RAN to trigger setup of the call. Further still, when a WCD receives a page message from the RAN on the forward link paging channel, the WCD may transmit a page response message in an access probe to the RAN. Moreover, the WCD may be arranged to transmit certain user data such as short message service (SMS) messages as data bursts in access probes to the RAN, to avoid the need to set up an air interface traffic channel for such communication.

OVERVIEW

In some situations, the reverse link air interface can become overwhelmed if too many WCDs seek to send access probes at once. In particular, if access probes from two or more WCDs line up (by chance) in the same access channel container, such as the same timeslot, an "access probe collision" may occur. The result of such a collision may be that the RAN will not receive any of the access probes in that container in a comprehensible form, due to interference between the access probes. Consequently, each WCD may have to re-transmit its access probe.

Particularly in situations where many users are placing calls at once, the number of access probes and access probe collisions can increase exponentially (or at least greatly). For example, after a football game or in an emergency situation, many people within a given coverage area may use their mobile phones to place calls (e.g., to call 911, to call friends and family, to check voice mail, or for other purposes). Each time a WCD attempts to place a call, as noted above, the WCD may send at least one access probe. Consequently, in a situation where many people within a given coverage area place calls at once, many access probes may be sent at essentially the same time. As a result, many access probe collisions may occur, and so still more access probes transmissions (re-transmissions) may occur. Further, at the same time, WCDs may be periodically registering with the system and responding to page messages and the like, which may additionally increase the number of access probe collisions and thus further overwhelm the access channel. Ultimately, this may result in delayed call setup and blocked calls, which may translate into unacceptable user experience.

Considering this, disclosed herein is a method and system for helping to manage access probe transmissions, particularly in a scenario where an event has occurred that is likely to result in high loading on the access channel. The method assumes that in such a scenario, there may be certain WCDs, and/or applications running on WCDs, that should receive preferred treatment, such as a guarantee or greater likelihood of being able to place calls without delay or blocking. For example, a wireless service provider may have a policy to provide preferential service to WCDs that are operated by emergency service personnel and/or applications such as push-to-talk and the like that tend to be used for emergency response management. Likewise, a wireless service provider may have a policy to provide preferential service to WCDs that operate under high class service agreements or the like.

In accordance with the method, when such an event occurs, the RAN may cause one or more WCDs to suppress transmission of access probes generally or for particular communication applications, but may allow transmission of access probes by one or more other WCDs and/or for one or more other communication applications. Optimally, for instance, the RAN may define a silent-period and cause a proper subset of the WCDs being served by the one or more base stations to suppress transmission of access probes for the duration of that silent-period, either generally or for particular applications, thus freeing up the access channel during that silent-period for use to carry access probes from other WCDs and/or for other applications.

In particular, disclosed in one respect is a method of managing transmission of access probes in a wireless communication system. The method may involve a processing unit determining that an external impact event has occurred, such as by receiving into the processing unit an alert that indicates occurrence of the external impact event. The external impact event may be an event that does not involve operation of the wireless communication system but that is likely to result in significant loading of the wireless communication system. Examples of such events include a severe weather event, a natural disaster, a chemical or nuclear disaster, a terrorist attack or other criminal activity, and a crowd-gathering event such as the ending of a sports event, concert, or demonstration, where many users may be likely to place calls at about the same time.

In response to determining that the external impact event occurred, the method may then involve wirelessly broadcasting from one or more base stations of the wireless communication system a control signal (e.g., one or more signals) that causes a proper subset of wireless communication devices served by the one or more base stations to suppress wireless transmission of access probes to the wireless communication system, while allowing other wireless communication devices served by the one or more base stations to wirelessly transmit access probes to the wireless communication system. For example, each of the one or more base stations may broadcast a suppression signal that one or more WCDs served by the base station is arranged to respond to by suppressing transmission of access probes for a period of time but that one or more high priority WCDs served by the base station would be arranged to disregard or to not respond to and would thus not suppress transmission of access probes for that period of time. Consequently, the method may help to ensure sufficient access channel capacity for transmission of access probes by the one or more high priority WCDs for at least the period of time that one or more other WCDs are suppressing access probe transmission.

Further, in another respect, disclosed is a method of managing transmission of access probes in a wireless communication system where a wireless communication device that is served by the wireless communication system is programmed with various communication applications that are each executable to cause the wireless communication device to send access probes to the wireless communication system (e.g., by triggering placement of calls or the like). The disclosed method may involve a processing unit determining that an external impact event has occurred. In turn, the method may then involve, responsive to determining that the external impact event has occurred, wirelessly broadcasting from a base station of the wireless communication system a control signal that causes the wireless communication device to suppress wireless transmission of access probes for communications by just a proper subset of the applications, while allowing wireless transmission of access probes to the wireless communication system for communications by one or more other applications.

Still further, disclosed is a communication system that includes a processing unit and one or more base stations having antennas that radiate to define wireless coverage areas in which to serve wireless communication devices. In the communication system, the processing unit may be arranged to receive an alert indicating occurrence of an external impact event that does not involve operation of the wireless communication system. Further, the processing unit may be arranged to respond to receiving the alert and to the alert indicating occurrence of the external impact event by causing the one or more base stations to wirelessly broadcast a control signal that causes a proper subset of the wireless communication devices to suppress wireless transmission of access probes to the wireless communication system, while allowing one or more other wireless communication devices served by the one or more base stations to wirelessly transmit access probes to the wireless communication system.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

BRIEF DESCRIPTION OF THE DRAWINGS

FIG. 3 is an illustration of a portion of a representative access channel.

DETAILED DESCRIPTION

Figure 1:
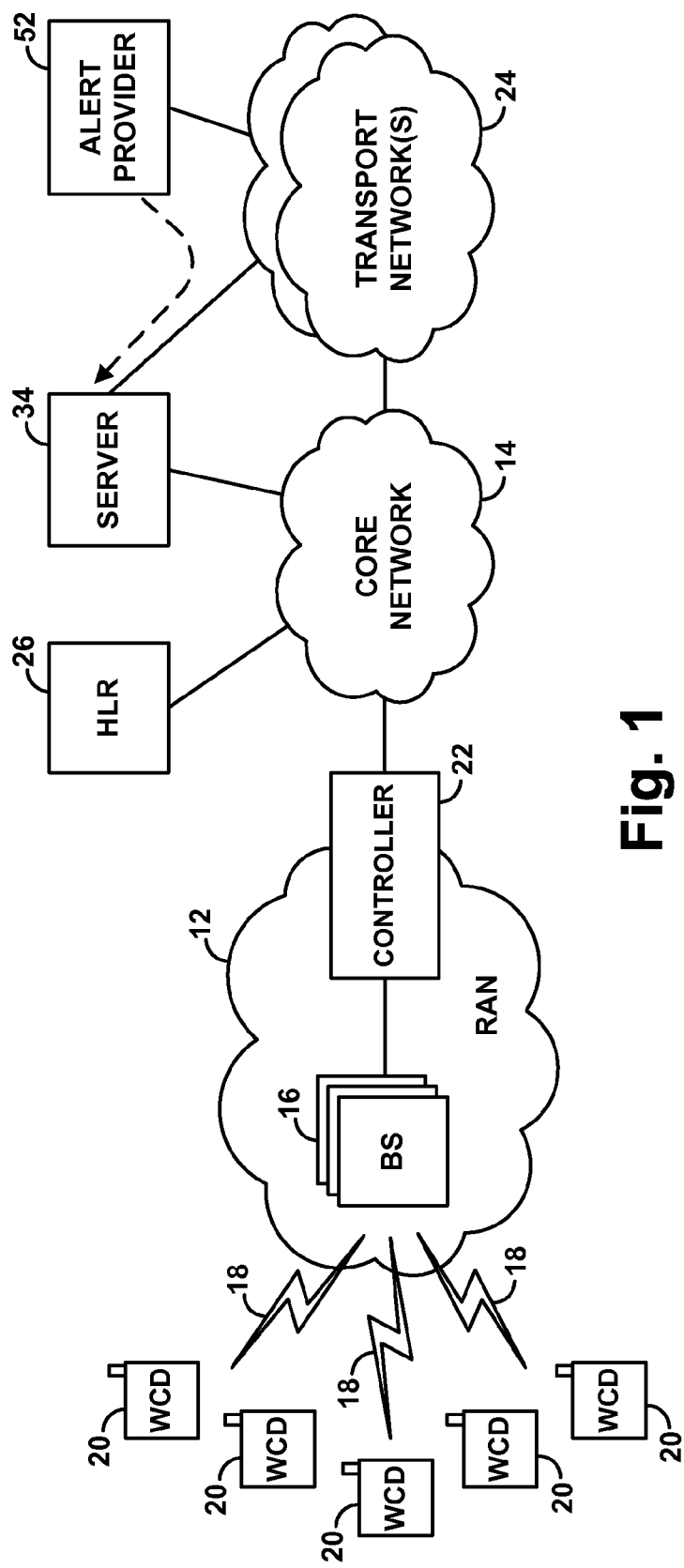
FIG. 1 is a simplified block diagram depicting a wireless communication system in connection with which the present method can be implemented.

Referring to the drawings, as noted above, FIG. 1 is a simplified block diagram depicting a wireless communication system in connection with which the present method can be implemented. It should be understood, however, that this and other arrangements described herein are set forth as examples only. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the example wireless communication system as including a RAN 12 and core network 14, both of which may be operated by a wireless carrier. RAN 12 is shown including one or more base stations 16 (e.g., base transceiver stations, access nodes, node-Bs, eNodeBs, or the like), each having one or more antennas and associated equipment to facilitate communication over a respective air interface 18 with one or more WCDs 20, such as cell phones, wirelessly equipped computing devices, embedded wireless modules, and other devices that may subscribe to service by the wireless carrier and are arranged to be served by the RAN. The RAN is then shown including or being coupled with a controller 22, such as a base station controller, mobile switching center, media gateway, radio network controller, mobility management entity, or the like, which, depending on implementation, may control aspects of base station and air interface operation and/or may provide connectivity with the core network 14. In turn, core network 14 provides connectivity with one or more transport networks 24, such as the public switched telephone network (PSTN) and the Internet.

Shown sitting as a node on core network 14 is a home location register (HLR) 26, which functions to maintain a home profile record of each WCD that subscribes to service with the wireless carrier in a particular region. In general, for each such WCD, the HLR may store a subscriber profile record as well as an indication of where in the RAN the WCD is currently operating, such as which base station, switch, or other node is currently serving the WCD, to facilitate setup of communications to the WCD. In practice, when a WCD powers on or moves into a new coverage area (e.g., a new paging zone or tracking area), the WCD may scan for and detect a pilot signal broadcast by a base station of the RAN and may then transmit a registration message in an access probe to that base station, which may trigger signaling to the HLR to update the WCD's current location. Further, as noted above, a WCD may periodically re-register in a similar manner with the RAN, which may function to confirm or update the record of its location.

When a WCD is located in the coverage area of given base station, the WCD may be served by the base station in an idle mode or an active mode. When a WCD is not actively engaged in a call and air interface traffic channel resources are thus not assigned for use by the WCD, the WCD is considered to be operating in an idle mode. In that mode, the WCD may regularly monitor an air interface paging channel for any page messages addressed to the WCD, such as a page message seeking to set up a call to the WCD or page message providing SMS text to the WCD for instance. Upon receipt of such a page message, as noted above, the WCD may then transmit a page response message in an access probe to the base station.

When an idle WCD seeks to originate a call or receives a page message seeking to set up a call to the WCD, as noted above, the WCD may transmit an origination message or a response in an access probe to the base station. In response, the RAN may then assign air interface traffic channel resources for the call and may allow the call to proceed, thereby transitioning the WCD to an active mode. In some implementations, threshold long pauses in traffic channel communication to or from an active WCD may cause the RAN to release the assigned traffic channel resources, thereby returning the WCD to an idle mode (technically a "dormant" mode) with respect to the air interface. When the paused traffic channel communication is to resume, the WCD may then again transmit another origination message in an access probe to the base station to request re-assignment of traffic channel resources, and the RAN may accordingly assign traffic channel resources, thus transitioning the WCD back to the active mode.

Figure 2:
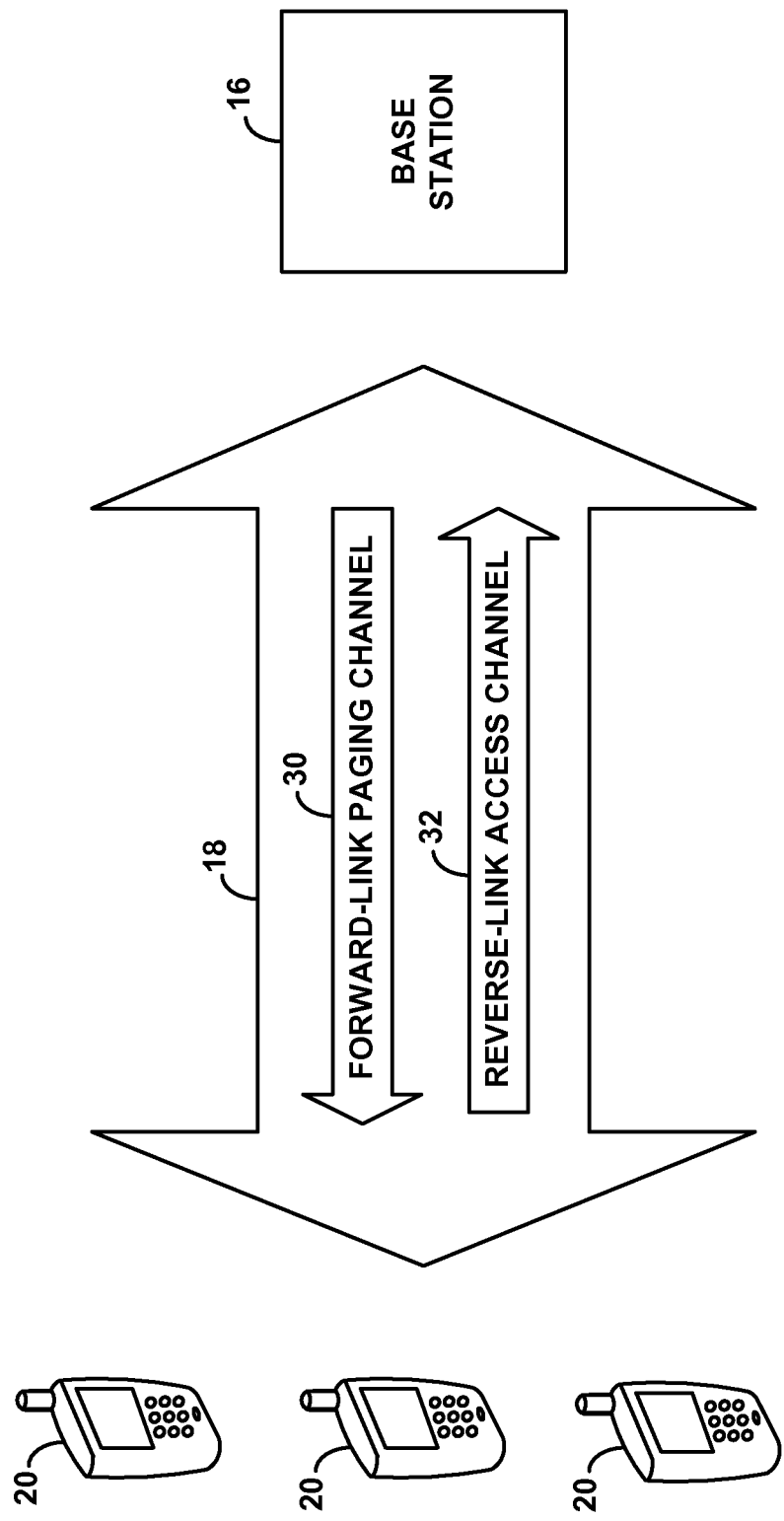
FIG. 2 is a diagram illustrating a portion of the wireless communication system of FIG. 1.

FIG. 2 is next a diagram illustrating a portion of the wireless communication system, with air interface 18 depicted in more detail. As shown by way of example in FIG. 2, air interface 18 includes a forward-link paging channel 30 and a reverse-link access channel 32. As noted above, the forward-link paging channel 30 may carry page messages and other control messages from a base station 16 to WCDs 20. The reverse-link access channel 32, on the other hand, carries access probes from WCDs 20 to base station 16.

As noted above, the access channel may be define containers for carrying access probes transmitted from WCDs to the base station, and the WCDs may thus be arranged to transmit access probes in those containers. In particular, in a typical implementation, when a WCD seeks to transmit an access probe to the RAN, the WCD may randomly select one of the containers of the access channel and transmit the access probe in that container. The RAN may then be arranged to monitor the individual containers of the access channel for any access probes transmitted from served WCDs.

FIG. 3 is an illustration of a portion of a representative access channel, showing a series of timeslots TS1-TS7. Further, the figure depicts ten example access probes AP1-AP10 transmitted within these various timeslots. As explained above, access probe transmission failure, possibly resulting in delayed or blocked communication, can occur due to access probe collision where two or more access probes are transmitted in the same access channel container. With the arrangement illustrated in FIG. 3, for instance, access probe collisions would likely occur in timeslots TS1, TS3 and TS5, because more than one access probe is being transmitted in each of those timeslots.

Figure 4:
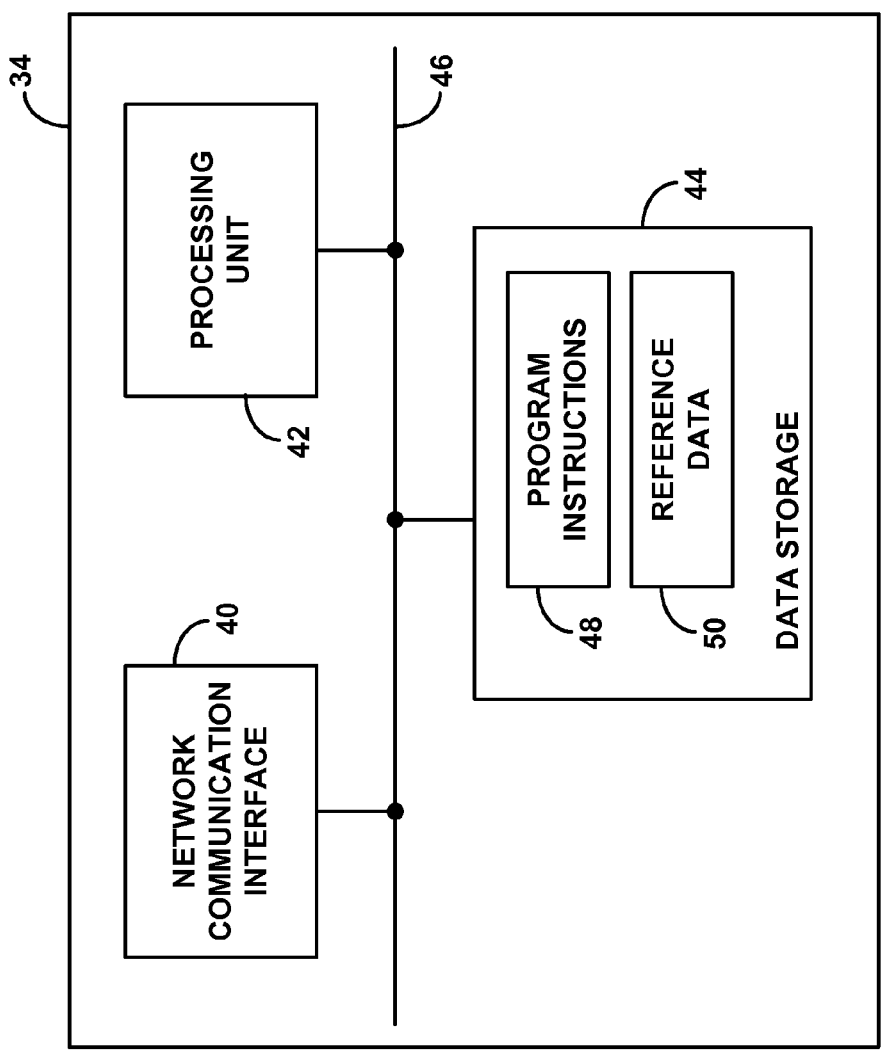
FIG. 4 is a simplified block diagram of a server operable in the method.

Returning now to FIG. 1, also shown sitting as a node on the core network 14 is a server 34, which may function to determine when an external impact event has occurred, to responsively determine which one or more base stations serve the likely to be impacted area, and to arrange for the determined base station(s) to broadcast a control signal that causes just a proper subset of WCDs served by the determined base station(s) to suppress access probe transmission. FIG. 4 is a simplified block diagram of such server 34, showing some of the components that the server may contain by way of example.

As shown in FIG. 4, the representative server 34 may include a network communication interface 40, a processing unit 42, and non-transitory data storage 44, all of which may be coupled together by a system bus, network, or other connection mechanism 46.

With this arrangement, network communication interface 40 functions to connect server 34 with core network 14 and allow the server to engage in communication via the core network with various other entities, such as with various alert providers situated on transport network(s) 24 to receive indications of alerts, and controller 22 to facilitate causing base stations to broadcast the presently contemplated control signal to cause one or more WCDs to suppress access probe transmission. Processing unit 42 may then comprise one or more general purpose processors (e.g., microprocessors) and/or one or more special purpose processors (e.g., application specific integrated circuits). And data storage 44 may comprise one or more volatile and/or non-volatile storage components, such as magnetic, optical, or flash storage, and may be integrated in whole or in part with processing unit 42.

As shown, data storage 44 may contain program instructions 48 and reference data 50. Program instructions 48 may be executable by processing unit 42 to carry out various functions described herein. Reference data 50 may then comprise various data usable by the processing unit to carry out the functions described. For instance, the reference data 50 may include mapping data that indicates where particular base stations and base station coverage areas are located so as to enabler the processing unit to decide which base stations should broadcast the control signal in accordance with the present method upon determining that an external impact event likely to affect a particular area has occurred.

Note that in an alternative arrangement, the processing unit and/or functions of the processing unit could be provided elsewhere in the system of FIG. 1, or could be distributed among various entities in the system. By way of example, the processing unit and corresponding functions could be provided at HLR 24, at controller 22, in one or more of the base stations, or elsewhere.

Turning again back to FIG. 1, shown sitting as a node on transport network(s) 24 (e.g., on the Internet) is an example alert provider 54, such as a server or other system that is arranged to generate and/or provide alerts regarding external impact events. Depending on the type of external impact event, the alert provider may take various forms and/or operate in various ways. By way of example, for weather emergencies, the alert provider may be a server operated by the National Weather Service, which may broadcast or otherwise provide alert messages regarding the occurrence of severe weather situations, specifying in each such message a level of significance of the alert and the affected location area(s). As another example, for terrorist attacks or other criminal activities, the alert provider may be a law enforcement entity, which may broadcast alert messages regarding the occurrence of the criminal activity, similarly specifying a level of significance and the affected location area(s). Such alerts may be set forth in text format in predefined message fields, so that a recipient entity such as server 34 can automatically parse the alert to determine that the external impact event is threshold significant and to determine the affected area(s).

In some implementations, the alert provider 54 may provide an alert about an external impact event in essentially real time in response to the event having just recently occurred. For instance, if a severe weather emergency or terrorist attack occurs, the alert provider may respond to the occurrence of that event by providing the alert. Server 34 may thus receive the alert and promptly take action in accordance with the present method.

Alternatively, the alert provider may provide an alert in advance of the external impact event, specifying in the alert when the event is scheduled to occur. In that case, the server 34 may receive the alert and programmatically schedule itself to take action in accordance with the present method at the indicated time. For example, the alert provider may have information indicating the time of day when a sporting event, concert, or demonstration is scheduled to end and may provide that timing information, along with a specification of the location of the event, in an alert to server 34. Server 34 may then responsively program itself to take action in accordance with the present method at the indicated time, with respect to one or more base stations serving the indicated location.

Figure 5:
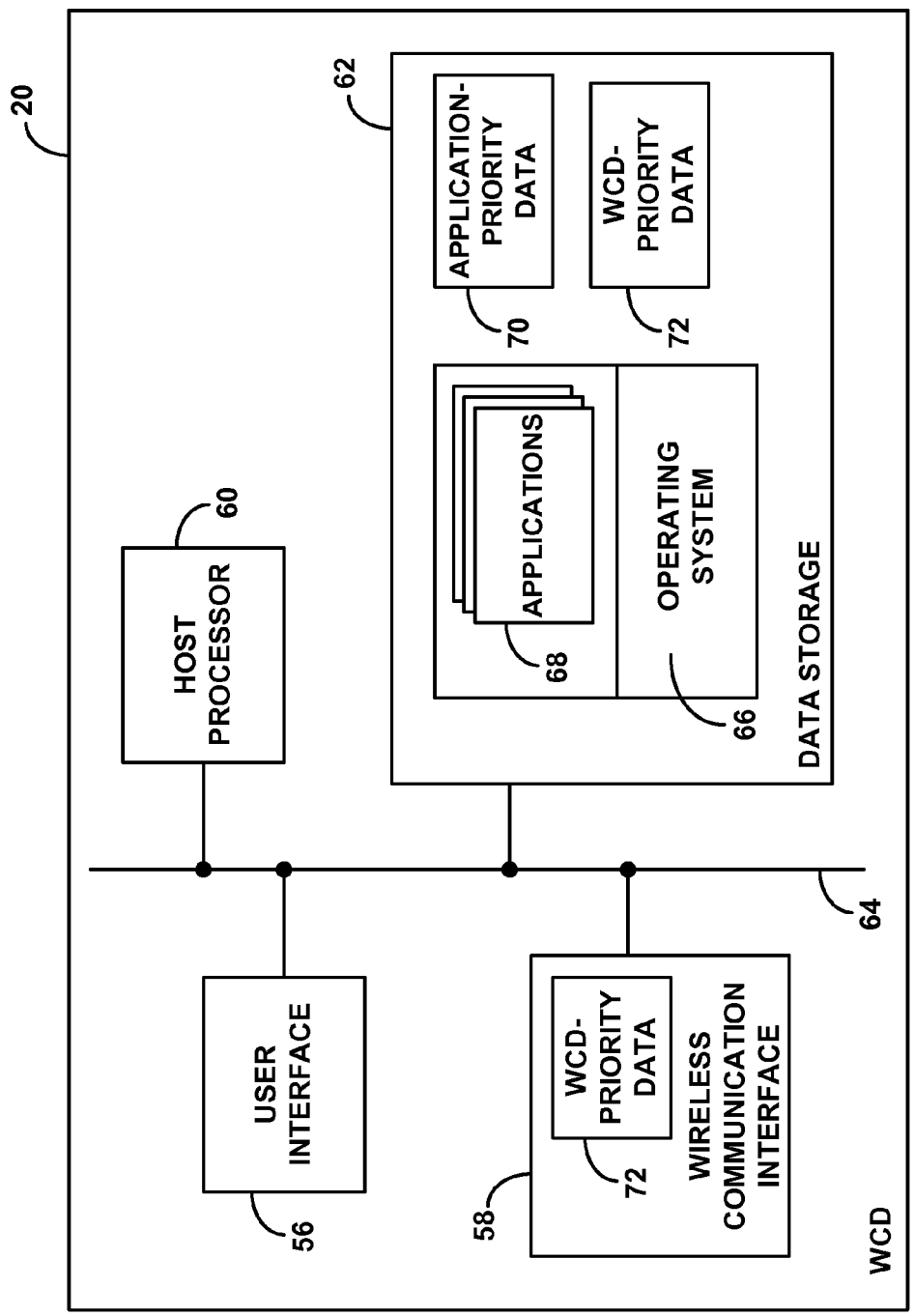
FIG. 5 is s simplified block diagram of a WCD operable in the method.

Referring next to FIG. 5, a block diagram of an example WCD is shown, to help illustrate how such a device might operate in an example implementation of the method. As shown in FIG. 5, the WCD includes a user interface 56, a wireless communication interface 58, a host processor 60, and non-transitory data storage 62, all of which may be coupled together by a system bus, network, or other communication mechanism 64.

In this arrangement, user interface 56 may function to facilitate user interaction with the WCD if appropriate. As such, the user interface may comprise input components such as a keypad, microphone, and touch-sensitive screen or pad, and output components such as a display screen and loudspeaker.

Wireless communication interface 58 may then function to enable the WCD to communicate over air interface 18 with one or more base stations 16, in accordance with an agreed air interface protocol such as one of those noted above for instance. As such, the wireless communication interface 58 may comprise one or more antennas as well as a chipset arranged to communicate according to one or more particular air interface protocols. Such a chipset may include logic for generating and transmitting access probes on the access channel 32, in response to various triggers arising internally on the chipset and/or communicated to the chipset from the host processor 60. For example, the chipset may itself be arranged to periodically generate and transmit a registration message in an access probe to the RAN, and to perhaps to automatically respond to certain page messages received from the RAN. Further, the chipset may receive from the host processor various signals triggering transmission of access probes, such as when one or more applications running on the WCD seek to originate calls for instance.

Host processor 60 may then comprise one or more general purpose processors and/or one or more special purpose processors and may be integrated in whole or in part with wireless communication interface 58. And data storage 62 may comprise one or more volatile and/or non-volatile storage components, such as magnetic, optical, or flash storage, and may be integrated in whole or in part with host processor 60.

As shown, data storage 62 may contain an operating system 66 and one or more applications 68 (any or all of which could alternatively be integrated with the operating system), all of which may define program instructions executable by the host processor 60 to carry out various WCD functions described herein. In a conventional manner, the operating system 66 may define an application programming interface (API) through which the various applications may interact with low-level components of the device such as the user interface 56 and wireless communication interface 58. For example, various applications may be arranged to initiate calls (e.g., voice calls or data communication sessions) by placing particular API calls that may cause the host processor 60 to signal to the wireless communication interface 58, which may in turn cause the wireless communication interface 58 to generate and transmit a call origination message in an access probe to the RAN. Likewise, various applications may be arranged to present information on the user interface by appropriate placing API calls. Other examples are possible as well.

The applications 68 may include various communication applications, each of which may have a respective application ID and/or an application type. One such application, for instance, may be a PSTN voice calling application, which may allow a user to place and receive legacy voice calls. Another such application may be an e-mail application. Still another such application may be an SMS application. And yet another such application may be a push-to-talk application that allows a user to engage in "instant-connect" establishment of packet-based real-time media communication sessions. Other examples are possible as well.

As further shown in FIG. 5, data storage 62 of the example WCD also contains a set of application-priority data 70. This data may specify, respectively for each application, by application ID and/or type, a priority level of the application, differentiating the applications as having different priority levels or levels of preference. These priority levels may be established specifically for purposes of the present method and/or for other purposes. By way of example, if emergency service personnel tend to use push-to-talk for voice communication, it may be appropriate to assign a high level of priority to any push-to-talk application on the WCD. Whereas, if typical consumers tend to use a PSTN calling for voice communication, it may be appropriate to assign a low level of priority to any PSTN calling application on the WCD. Similar distinctions could be drawn for other applications or application types as well. Further, there could be multiple levels of priority, beyond just high and low for instance.

Still further, as also shown, data storage 62 and/or wireless communication interface 58 may include WCD-priority data 72. This data may specify a priority or preference level of the WCD, such as a level of service or preference established in accordance with a service level agreement or pursuant to government regulations for instance. As with the application-priority data, this WCD-priority data could be established specifically for purposes of the present method and/or for other purposes. By way of example, WCDs used by law enforcement personnel, emergency service personnel, government personnel, or the like, or by users who subscribe to receive preferential service, could be assigned a relatively high level of priority and thus be served by the wireless carrier under a relatively high priority service level, whereas WCDs used by others such as by normal service level subscribers could be assigned a normal or relatively low level of priority and thus be served by the wireless carrier under a relatively low priority service level.

In accordance with the method, the WCD may be arranged to carry out various WCD functions described herein in various ways. For instance, the WCD may carry out these functions through operation of the host processor 60 executing program instructions that are part of the operating system, part of one or more applications specially provided for purposes of the present method for instance, and/or otherwise provided. For instance, when the wireless communication interface 58 receives a control signal from a serving base station in accordance with the method, the wireless communication interface may signal to the host processor 60, and the host processor may take action to suppress access probe transmission if and to the extent appropriate. Alternatively or additionally, the WCD may carry out these functions through operation of the wireless communication interface 58. For instance, when the wireless communication interface 58 receive a control signal from a serving base station in accordance with the method, the wireless communication interface may itself take action to suppress access probe transmission if and to the extent appropriate.

Figure 6:
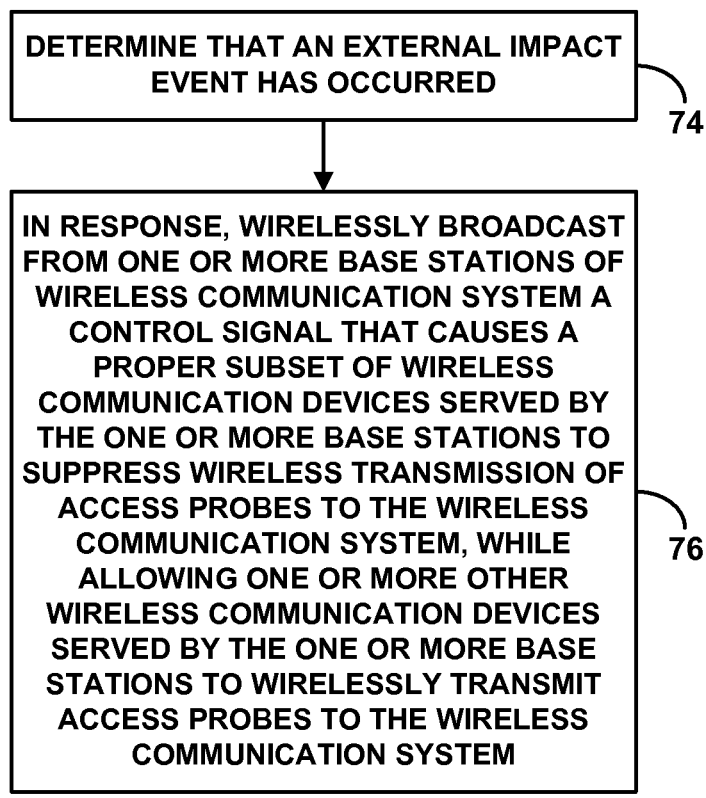
FIG. 6 is a flow chart depicting functions that can be carried out in accordance with the method.

FIG. 6 is next a flow chart depicting functions that can be carried out in accordance with the present method, to manage transmission of access probes in a wireless communication system.

As shown in FIG. 6, at block 74, the method may involve determining at a processing unit that an external impact event has occurred. In line with the discussion above, for instance, processing unit 42 of server 34 could determine that the external impact event has occurred (rightly or wrongly) by receiving from alert provider 54 an alert generated and provided in response to the occurrence of the event. Alternatively, processing unit 42 could receive an indication of when the event is scheduled to occur, and the act of determining that the event occurred may involve determining when that predetermined time comes, possibly receiving an internally generated alert indicating occurrence of the external impact event. Determining that the external impact event has occurred may further include determining, based on significance data provided in the alert for instance, that the external impact event is significant enough to warrant suppressing certain access probe transmission, as a condition to proceeding with the method.

In practice, an alert message or other indication of occurrence of the external impact event may specify a location of the occurrence of the external impact event, such as a geographic definition of a polygon defining the area at issue. In that case, the method may then further comprise the processing unit or other entity reading the message to determine the specified location, using the mapping data discussed above as a basis to select one or more base stations (of the carrier's multiple base stations for instance) based on their proximity to the determined location, such base stations that provide coverage within the determined location. Further, the method may involve the processing unit then causing the selected base station(s) to wirelessly broadcast the control signal.

At block 76, in response to determining that the external impact event has occurred, the method may then involve wirelessly broadcasting from one or more base stations of the wireless communication system a control signal that causes a proper subset of wireless communication devices served by the one or more base stations to suppress wireless transmission of access probes to the wireless communication system, while allowing one or more other wireless communication devices served by the one or more base stations to wirelessly transmit access probes to the wireless communication system.

In the example implementation, this responsive broadcasting of the control signal may arise by the processing unit signaling to controller 22, possibly informing controller 22 which base station(s) should broadcast the control signal, and then controller 22 causing the subject base station(s) to broadcast the control signal. For instance, the controller may send the signal to the base station(s) with a directive for the base station(s) to wirelessly broadcast the signal. Alternatively, the process may take other forms.

The act of "wirelessly broadcasting" the control signal may itself also take various forms. For instance, each base station may broadcast the control signal by transmitting the signal on a forward link paging channel, in a reserved sub-channel or field for instance. Further, such broadcasting could occur repeatedly. All WCDs in the coverage area receiving that paging channel, or at least the proper subset of the WCDs served by the one or more base stations, may then monitor and detect the control signal as provided on the paging channel. Alternatively, if a mechanism exists to identify the specific WCDs in coverage of the base station, the base station could broadcast the control signal essentially by unicasting it to each such WCD. Furthermore, the broadcasting may involve providing the control signal directly or providing a trigger that causes each recipient WCD to download or otherwise obtain the control signal. Other examples are possible as well.

Optimally, the proper subset of WCDs served by the one or more base stations may be those WCDs that have are served under a normal or relatively low priority service level, so that those devices would suppress access probe transmission, whereas the other WCDs served by the one or more base stations may be those that are served under a higher priority service level, so those other devices would not suppress access probe transmissions.

In practice, when each WCD receives the control signal broadcast by the one or more base stations, the WCD may determine based on its priority level whether it should take action to suppress access probe transmission. Alternatively, just the low priority WCDs may be arranged to take action in response to the control signal, and the high priority WCDs may include no such logic and may therefore disregard the control signal and thus not take action in response. For example, in advance of broadcasting the control signal, the method may further involve provisioning the proper subset of WCDs with logic (e.g., program logic and/or the above noted WCD-priority data) that causes the proper subset of wireless communication devices to respond to the control signal by suppressing transmission of access probes to the wireless communication system. Whereas, the other WCDs might not be so provisioned.

The act of a given WCD suppressing transmission of access probes may involve the WCD transitioning to a mode in which the WCD would block its transmission of access probes. In that mode, when a trigger would normally cause the WCD to transmit an access probe, the WCD may not transmit the access probe and may, perhaps, hold the probe or delay transmitting the probe until a later time when access probe transmission is no longer suppressed. Thus, for instance, in such a mode, if the WCD would normally transmit a registration request and/or call origination request in an access probe, the WCD will delay or cancel such transmission.

Optimally while the proper subset of WCDs is suppressing transmission of access probes, the one or more other served WCDs may still transmit access probes. Thus, by way of example, if an first-responder device needs to place a call and was essentially blocked from doing so as a result of excessive access channel use, the control signal sent according to the present method may cause the proper subset of WCDs to suppress their access probe transmission, and the first-responder device may then be able to successfully place the call.

In practice, the control signal transmitted by the one or more base stations may specify a silent-period throughout which the proper subset of WCDs should suppress transmission of access probes to the wireless communication system. Each WCD of the proper subset may thus respond to receipt of the control signal by suppressing transmission of access probes to the wireless communication system throughout that specified silent-period, reverting to no longer apply such suppression upon expiration of the period. Optimally, such a silent-period may thus provide a time for the other WCDs to transmit access probes to the wireless communication system while the proper subset of wireless communication devices are suppressed from transmitting access probes to the wireless communication system.

Furthermore, the control signal may specify not only a length of the silent-period but also a frequency of repeating the silent-period, possibly along with a delay interval between each repeated instance. In response to such a control signal, each recipient WCD of the proper subset may thus suppress transmission of access probes throughout the duration of each repeated instance of the specified silent-period, thus freeing up additional access channel capacity for use by the one or more other WCDs.

Figure 7:
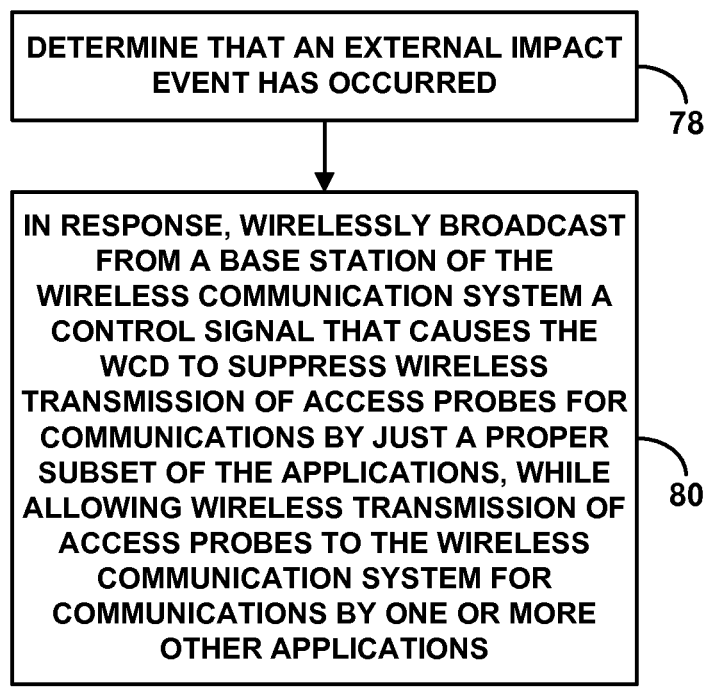
FIG. 7 is another flow chart depicting functions that can be carried out in accordance with the method.

FIG. 7 is next another flow chart depicting functions that can be carried out in accordance with the method, to manage transmission of access probes in a wireless communication system. In this implementation, as discussed above, a WCD that is served by the wireless communication system may be programmed with various communication applications that are each executable to cause the WCD to send access probes to the wireless communication system.

At block 78, the method may then involve a processing unit determining that an external impact event has occurred, as discussed above, and further determining a base station that provides coverage in the affected area. In turn, at block 80, the method may then involve, in response, wirelessly broadcasting from a base station of the wireless communication system a control signal that causes the WCD to suppress wireless transmission of access probes for communications by just a proper subset of the applications (i.e., one or more applications), while allowing wireless transmission of access probes to the wireless communication system for communications by one or more other applications.

In practice, the WCD may respond to the control signal in this example by making use of the application-priority data discussed above. For instance, the host processor 60 may respond to the control signal by setting the WCD to operate in a mode in which the host processor blocks requests from any low priority applications that would cause wireless communication interface 58 to transmit access probes, but the host process still allows requests by any high priority applications that would cause the wireless communication interface to transmit access probes. As a specific example, the result of this process may be that the WCD prevents call origination by any PSTN calling applications and messaging any SMS applications but allows call origination by push-to-talk applications. This result may be commercially useful, as first-responder devices might be more likely than certain other devices to use push-to-talk applications.

Similar to the WCD-priority implementation above, the WCD in the present example may be provisioned in advance with suppression logic that causes the WCD to respond to the control signal by transitioning to a mode in which the WCD blocks access attempts by each application of a relatively high service priority level but allows access attempts by each application of a relatively low service priority level. Further, as with the implementation above, the control signal may specify a silent-period and perhaps a frequency of repeating the silent-period, and the suppression of access probe transmission for communications by the proper subset of applications may occur in accordance with that specification.

Exemplary embodiments have been described above. It should be understood, however, that variations from these embodiments are possible, while remaining within the true spirit and scope of the invention.

We claim:

1. A method of managing transmission of access probes in a wireless communication system, the method comprising:
   determining at a processing unit that an external impact event has occurred, the external impact event not involving operation of the wireless communication system; and
   responsive to the determining, wirelessly broadcasting from one or more base stations of the wireless communication system a control signal that causes a proper subset of wireless communication devices served by the one or more base stations to suppress wireless transmission of access probes to the wireless communication system, while allowing one or more other wireless communication devices served by the one or more base stations to wirelessly transmit access probes to the wireless communication system, wherein the control signal specifies a silent-period throughout which the proper subset of wireless communication devices should suppress transmission of access probes to the wireless communication system, and wherein the control signal causes the proper subset of wireless communication devices to suppress transmission of access probes to the wireless communication system throughout the specified silent-period.

2. The method of claim 1, wherein the external impact event comprises at least one of a severe weather event, a natural disaster, a chemical or nuclear disaster, criminal activity, and a crowd-gathering event.

3. The method of claim 1, wherein the wireless communication system serves wireless communication devices under various different service levels, and wherein the proper subset of wireless communication devices are served under a first service level, whereas the other wireless communication devices are served under a second service level having a higher priority than the first service level.

4. The method of claim 3, wherein the other wireless communication devices are first-responder devices, and the proper subset of wireless communication devices are not first-responder devices.

5. The method of claim 1, further comprising:
   in advance of broadcasting the control signal, provisioning the proper subset of wireless communication devices with logic that causes the proper subset of wireless communication devices to respond to the control signal by suppressing transmission of access probes to the wireless communication system.

6. The method of claim 1, further comprising:
   in advance of broadcasting the control signal, provisioning the proper subset of wireless communication devices with logic that causes the proper subset of wireless communication devices to respond to the control signal by suppressing transmission of access probes to the wireless communication system, whereby the silent-period provides a time for the one or more other wireless communication devices to transmit access probes to the wireless communication system while the proper subset of wireless communication devices are suppressed from transmitting access probes to the wireless communication system.

7. The method of claim 1, wherein the control signal specifies a length of the silent-period and a frequency of repeating the silent-period, and causes the proper subset of wireless communication devices to suppress transmission of access probes to the wireless communication system throughout each repeated instance of the specified silent-period.

8. The method of claim 1, wherein determining that the external impact event has occurred comprises receiving an alert indicating occurrence of the external impact event, wherein the alert comprises a message specifying a location of the occurrence of the external impact event, the method further comprising:
  reading the message to determine the specified location;
  selecting the one or more base stations based on proximity of the one or more base stations to the determined location; and
  causing the selected one or more base stations to wirelessly broadcast the control signal.

9. The method of claim 1, wherein broadcasting the control signal comprises repeatedly broadcasting the control signal.

10. The method of claim 1, wherein broadcasting the control signal comprises broadcasting the control signal on an air interface paging channel monitored by at least the proper subset of wireless communication devices.

11. A method of managing transmission of access probes in a wireless communication system, wherein a wireless communication device served by the wireless communication system is programmed with various communication applications that are each executable to cause the wireless communication device to send access probes to the wireless communication system, the method comprising:
  determining by a processing unit that an external impact event has occurred, the external impact event not involving operation of the wireless communication system; and
  responsive to the determining, wirelessly broadcasting from a base station of the wireless communication system a control signal that causes the wireless communication device to suppress wireless transmission of access probes for communications by just a proper subset of the applications, while allowing wireless transmission of access probes to the wireless communication system for communications by one or more other applications.

12. The method of claim 11, wherein each application of the proper subset of applications has a first service priority level and each other application has a second service priority level higher than the first service priority level, the method further comprising:
  in advance of broadcasting the control signal, provisioning the wireless communication device with suppression logic that causes the wireless communication device to respond to the control signal by transitioning to a mode in which the wireless communication device blocks access attempts by each application of the first service priority level but allows access attempts by each application of the second service priority level.

13. The method of claim 11, wherein the external impact event comprises at least one of a severe weather event, a natural disaster, a chemical or nuclear disaster, criminal activity, and a crowd-gathering event.

14. The method of claim 11, wherein the control signal specifies a silent-period throughout which the wireless communication device should suppress transmission of access probes to the wireless communication system for communications by the proper subset of applications, and wherein the control signal causes the wireless communication device to enter into a mode in which the wireless communication device suppresses transmission of access probes to the wireless communications system for communications by the proper subset of the applications throughout the specified silent-period.

15. The method of claim 14, wherein the control signal specifies a length of the silent-period and a frequency of repeating the silent-period, and causes the wireless communication device to suppress transmission of access probes to the wireless communication system for communications by the proper subset of applications throughout each repeated instance of the specified silent-period.

16. The method of claim 11, wherein determining that the external impact event has occurred comprises receiving an alert indicating occurrence of the external impact event, the alert comprising a message specifying a location of the occurrence of the external impact event, the method further comprising:
  reading the message to determine the specified location;
  selecting the base station based on proximity of the base station to the determined location; and
  causing the selected base station to wirelessly broadcast the control signal.

17. A communication system comprising:
  one or more base stations including antennas radiating to define wireless coverage areas in which to serve wireless communication devices; and
  a processing unit, wherein the processing unit is arranged to receive an alert indicating occurrence of an external impact event that does not involve operation of the wireless communication system, and wherein the processing unit is arranged to respond to receiving the alert and to the alert indicating occurrence of the external impact event, by causing the one or more base stations to wirelessly broadcast a control signal that causes a proper subset of the wireless communication devices to suppress wireless transmission of access probes to the wireless communication system, while allowing one or more other wireless communication devices served by the one or more base stations to wirelessly transmit access probes to the wireless communication system, wherein the control signal specifies a silent-period throughout which the proper subset of wireless communication devices should suppress transmission of access probes to the wireless communication system, and wherein the control signal causes the proper subset of wireless communication devices to suppress transmission of access probes to the wireless communication system throughout the specified silent-period.

18. The communication system of claim 17, wherein the external impact event comprises at least one of a severe weather event, a natural disaster, a chemical or nuclear disaster, criminal activity, and a crowd-gathering event.

19. The communication system of claim 17, wherein the alert comprises a message specifying a location of the occurrence of the external impact event, and wherein the processing unit is further arranged to (i) read the message to determine the specified location, (ii) select the one or more base stations based on proximity of the one or more base stations to the determined location, and (iii) causing the selected one or more base stations to wirelessly broadcast the control signal.

* * * * *